United States Patent [19]
Abramson et al.

[11] Patent Number: 5,708,843
[45] Date of Patent: Jan. 13, 1998

[54] METHOD AND APPARATUS FOR HANDLING CODE SEGMENT VIOLATIONS IN A COMPUTER SYSTEM

[75] Inventors: Jeffrey M. Abramson, Aloha; Haitham Akkary, Portland; Andrew F. Glew, Hillsboro; Glenn J. Hinton; Kris G. Konigsfeld, both of Portland; Rohit Vidwans, Beaverton, all of Oreg.

[73] Assignee: Intel Corporation, Santa Clara, Calif.

[21] Appl. No.: 544,558

[22] Filed: Oct. 18, 1995

[51] Int. Cl.$^6$ .............................. G06F 9/38; G06F 9/312
[52] U.S. Cl. .................. 395/800.23; 395/394; 395/566
[58] Field of Search ......................... 395/800, 376, 395/800.23, 591, 391, 393, 467, 444, 445, 566

[56] References Cited

U.S. PATENT DOCUMENTS

| | | | |
|---|---|---|---|
| 5,463,745 | 10/1995 | Vidwans et al. | 395/375 |
| 5,574,935 | 11/1996 | Vidwans et al. | 395/800 |
| 5,623,428 | 4/1997 | Kunii et al. | 364/578 |

OTHER PUBLICATIONS

"The Metaflow Architecture", pp. 10—13 and 63—73, by Val Popescu, Merle Schultz, John Spracklen, Gary Gibson, Bruce Lightner, and David Isaman, IEEE Micro, 1991.

Superscalar Microprocessor Design, by M. Johnson, Prentice Hall (1991).

Primary Examiner—Larry D. Donaghue
Attorney, Agent, or Firm—Blakely, Sokoloff, Taylor & Zafman

[57] ABSTRACT

A memory operation is issued in a processor. Upon detecting both that the memory operation produces a code segment violation and that the memory operation is blocked at retirement, a blocking signal is produced to block a bus access responsive to the memory operation. A second signal signifies that the memory operation completed.

5 Claims, 12 Drawing Sheets

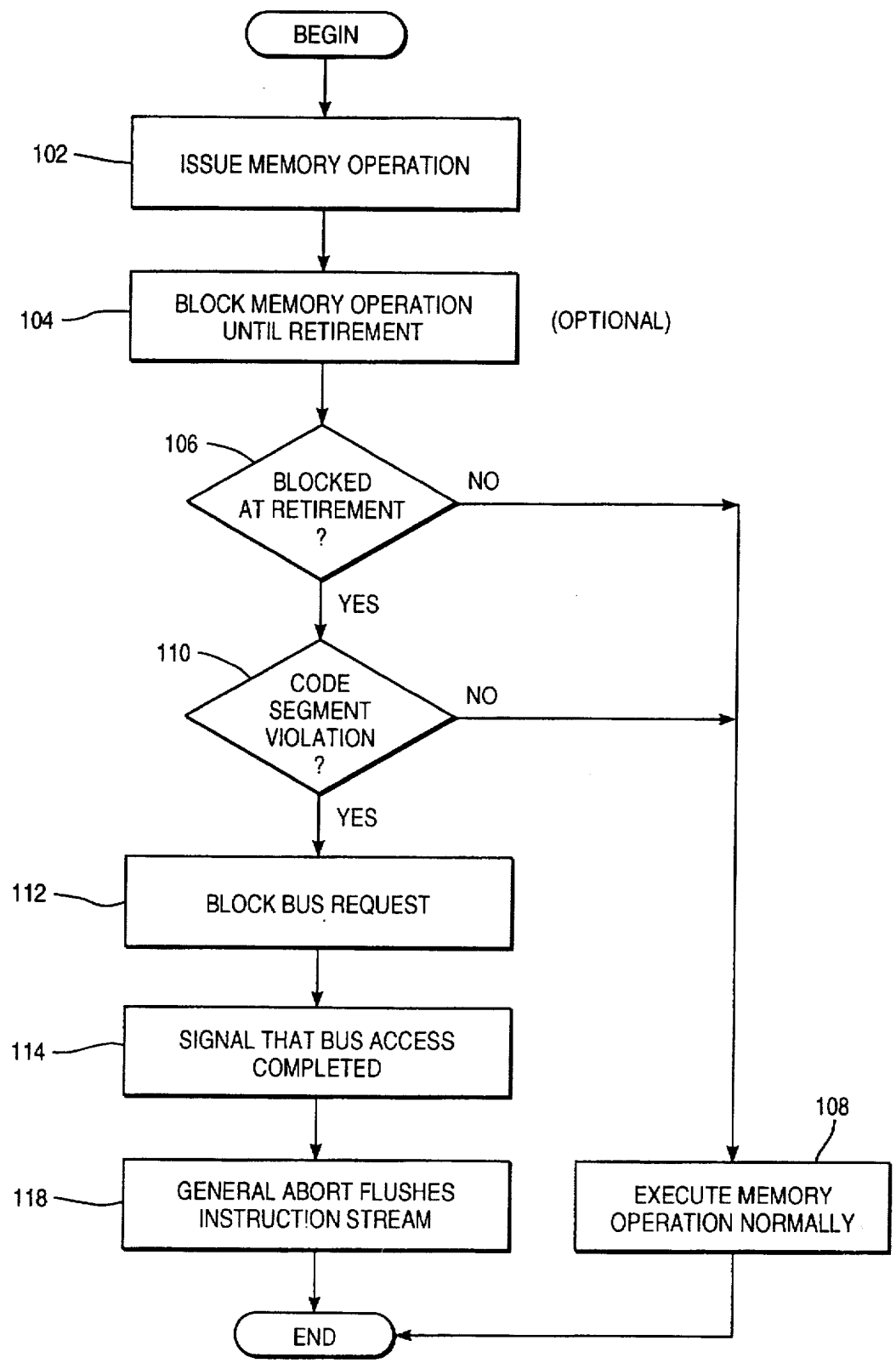
FIG_1

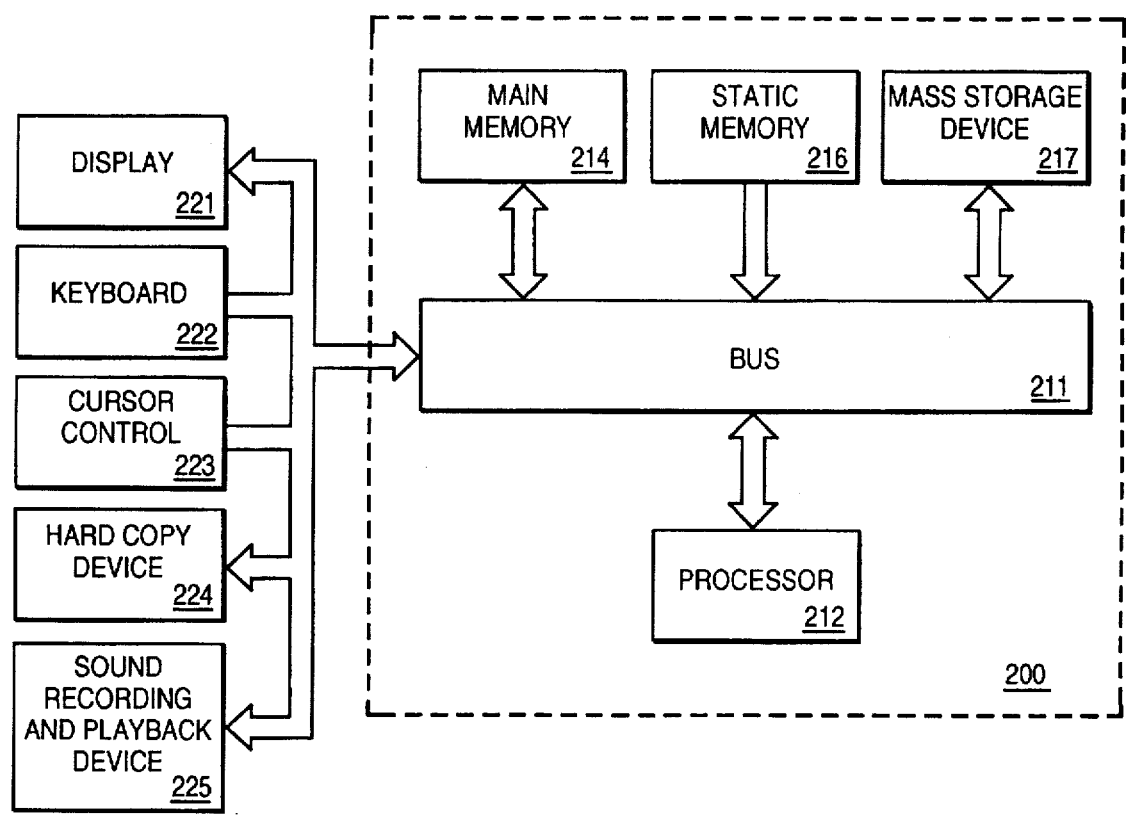
FIG_2A

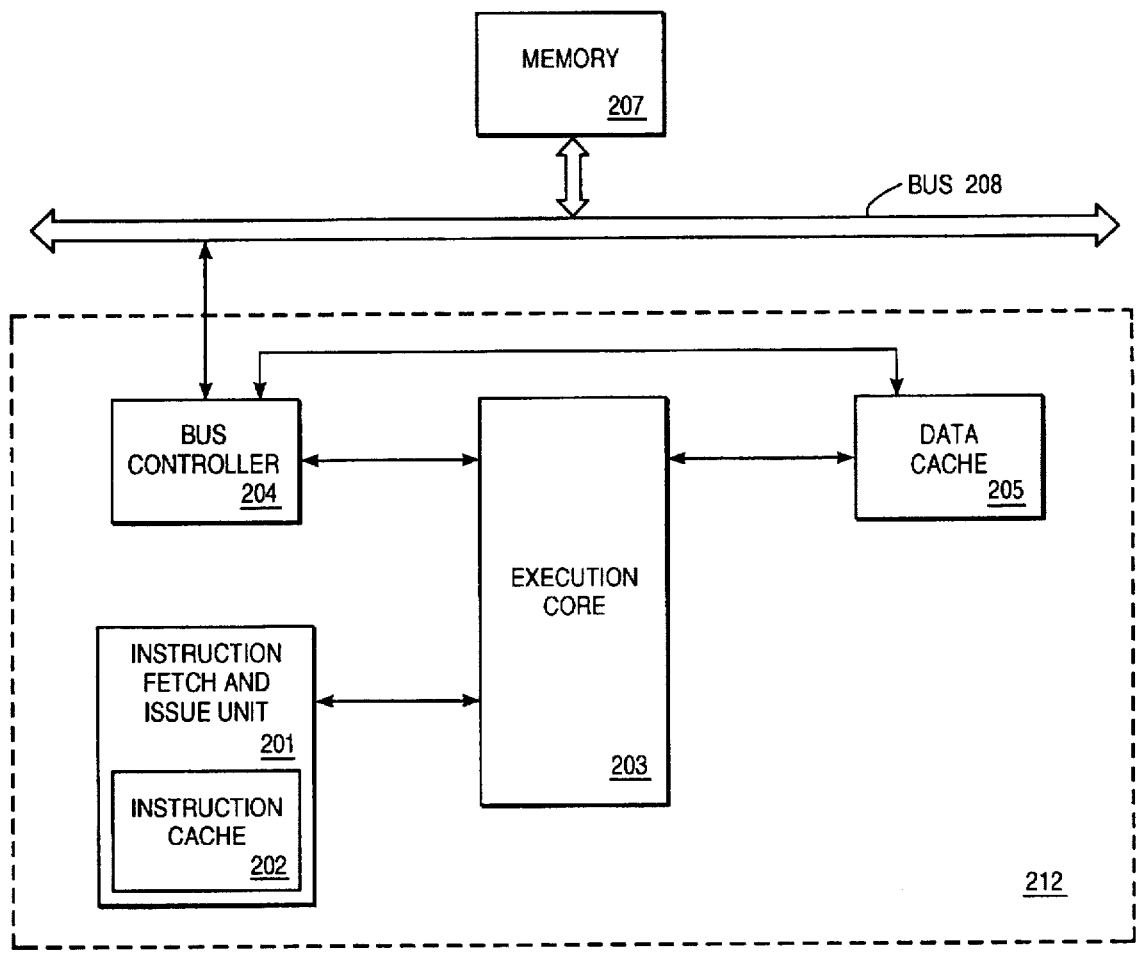
FIG_2B

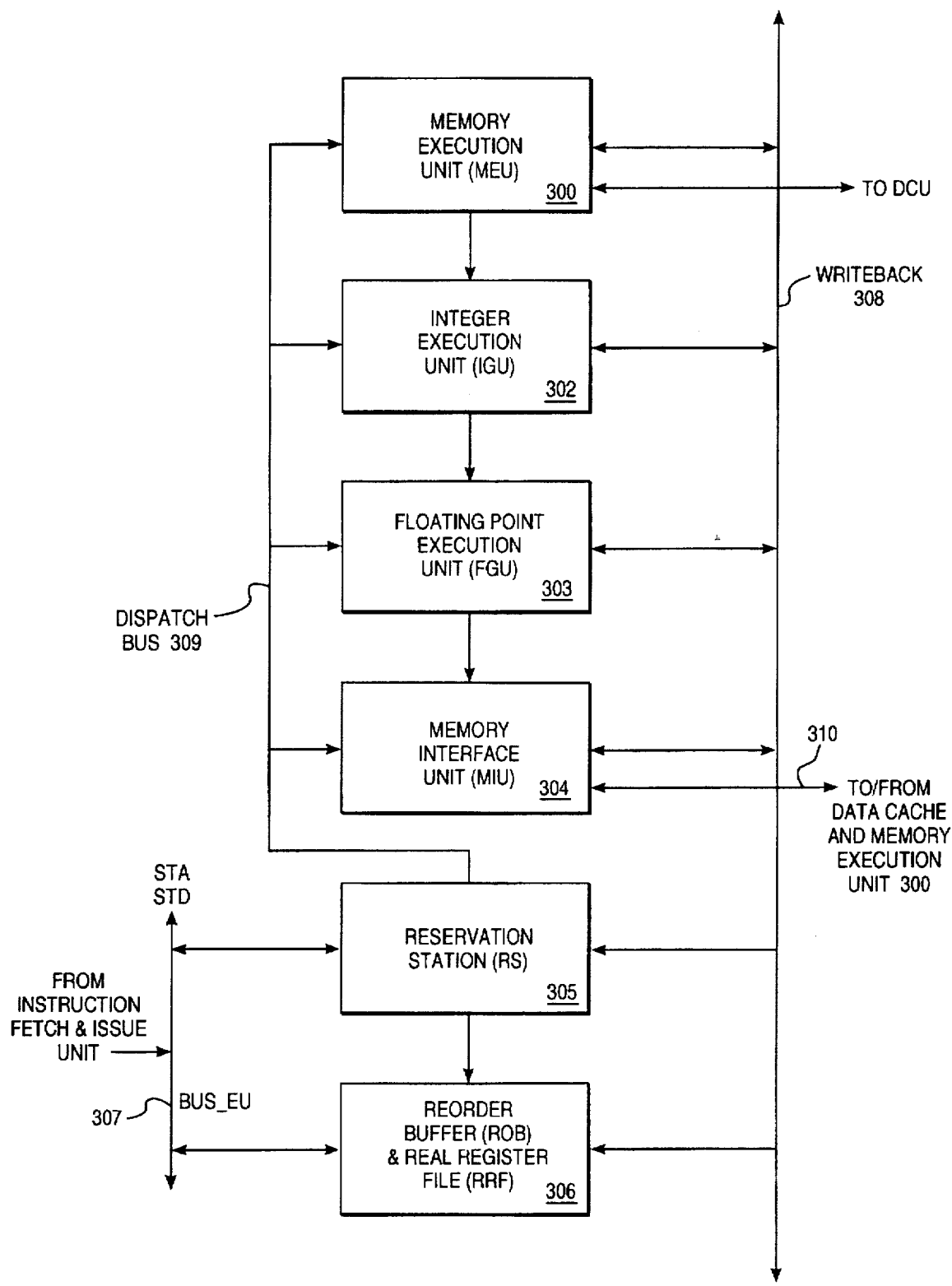
FIG_3

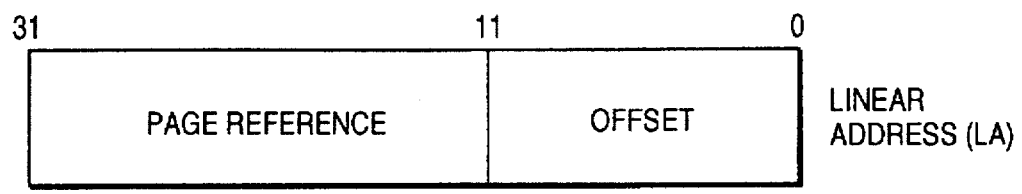
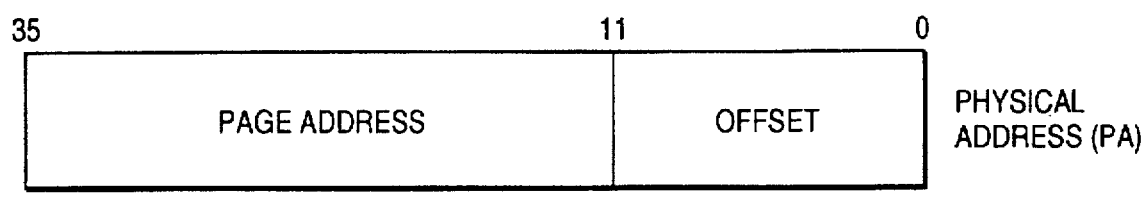
FIG_4

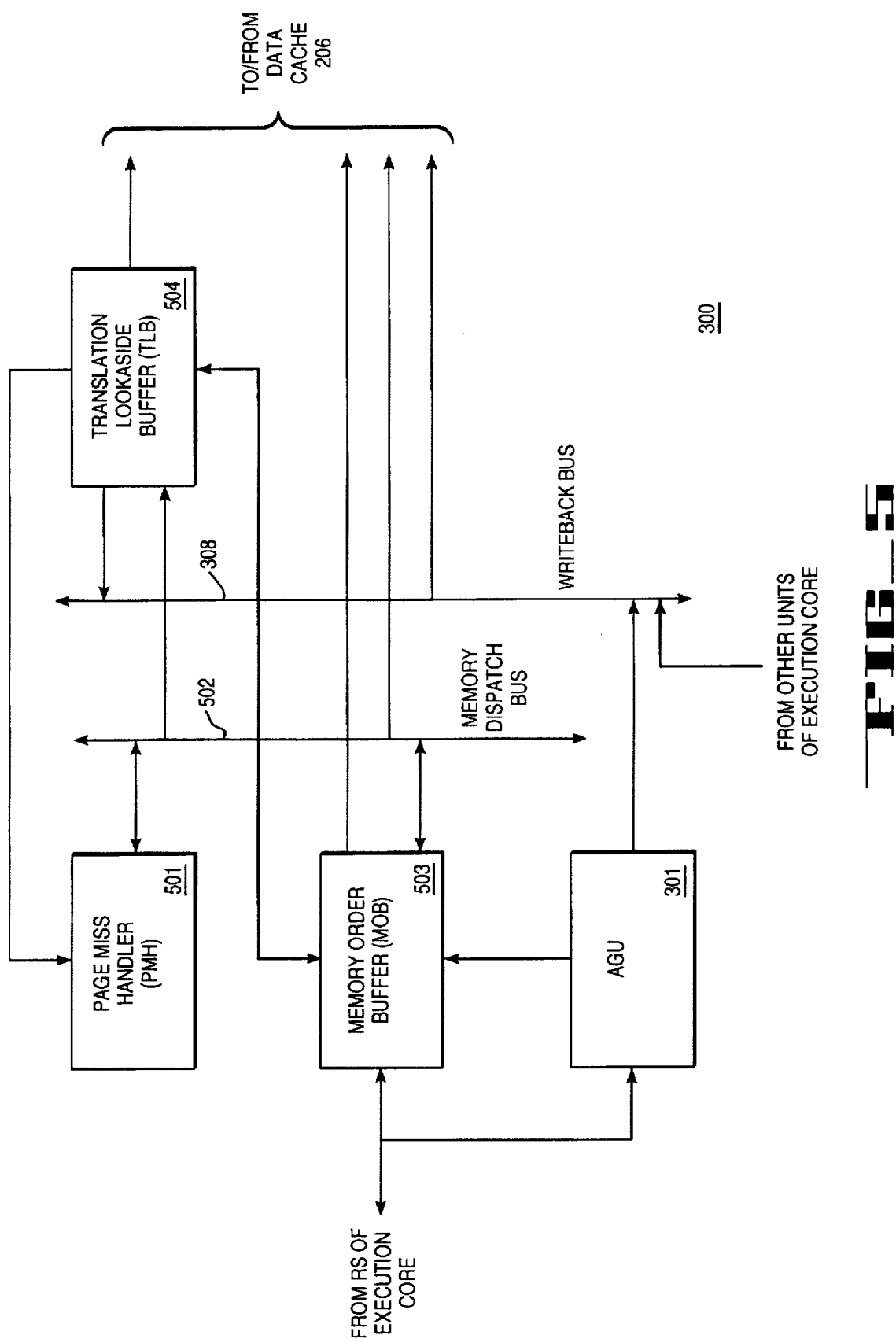
FIG_5

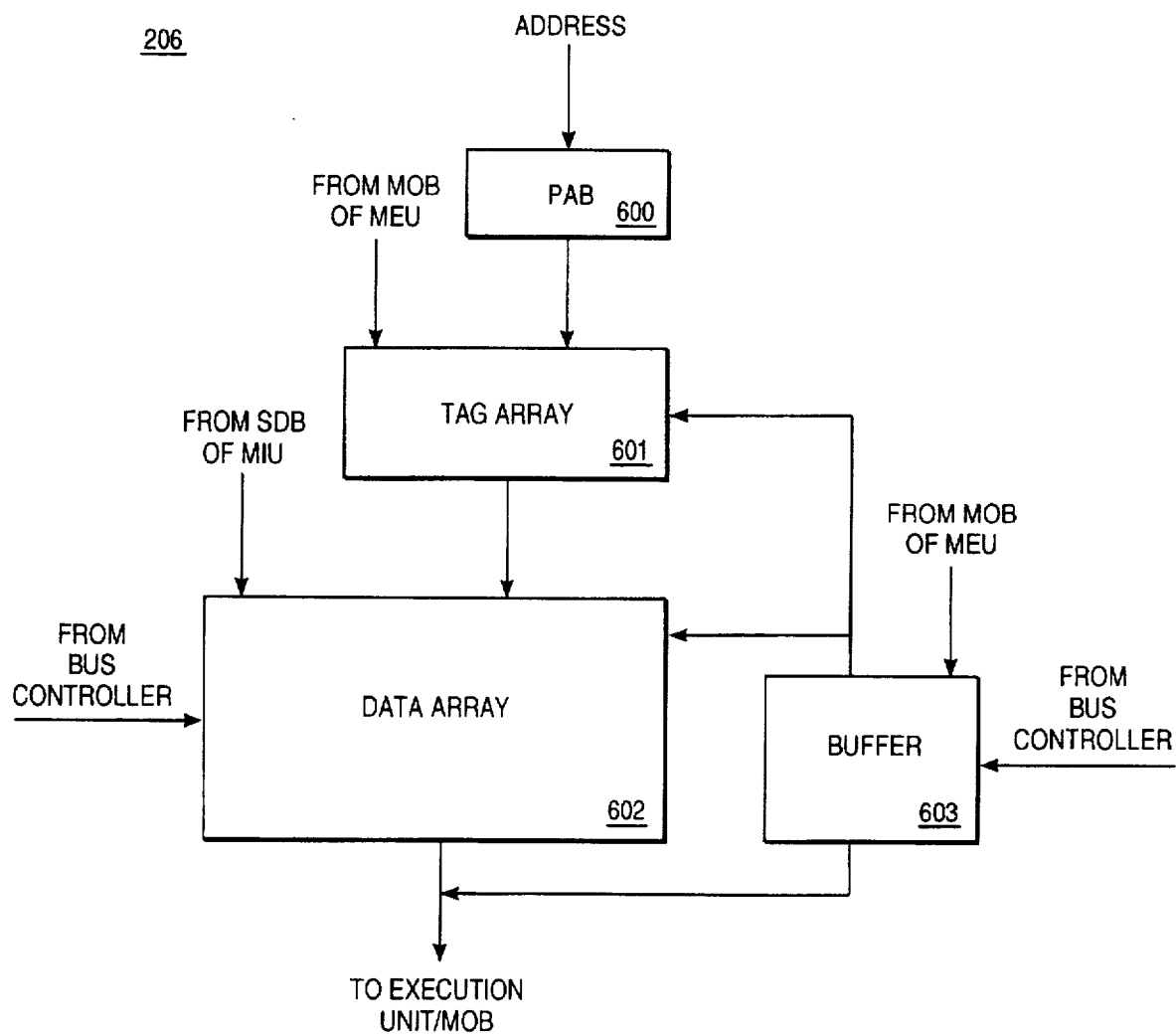
FIG_6

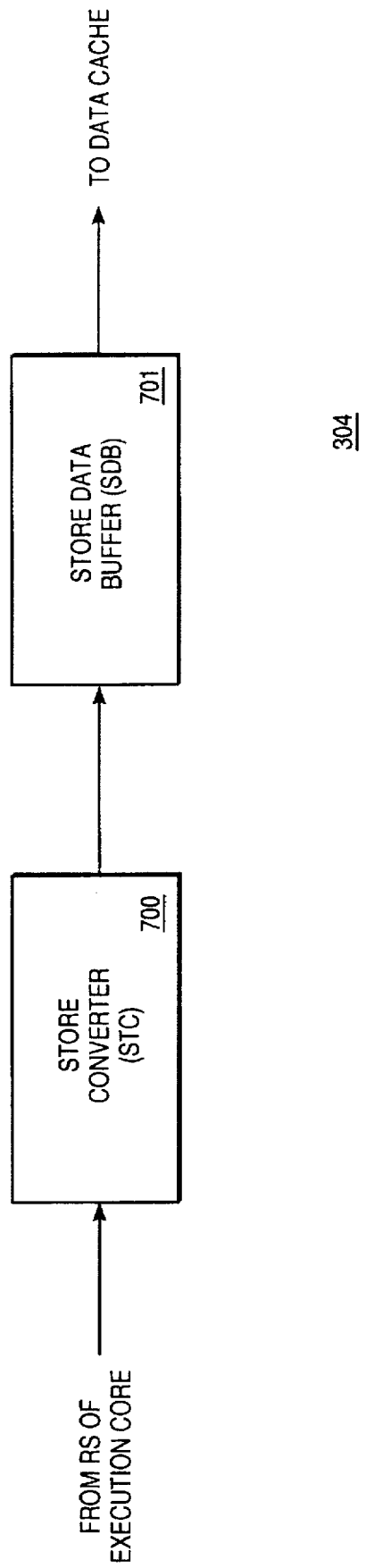

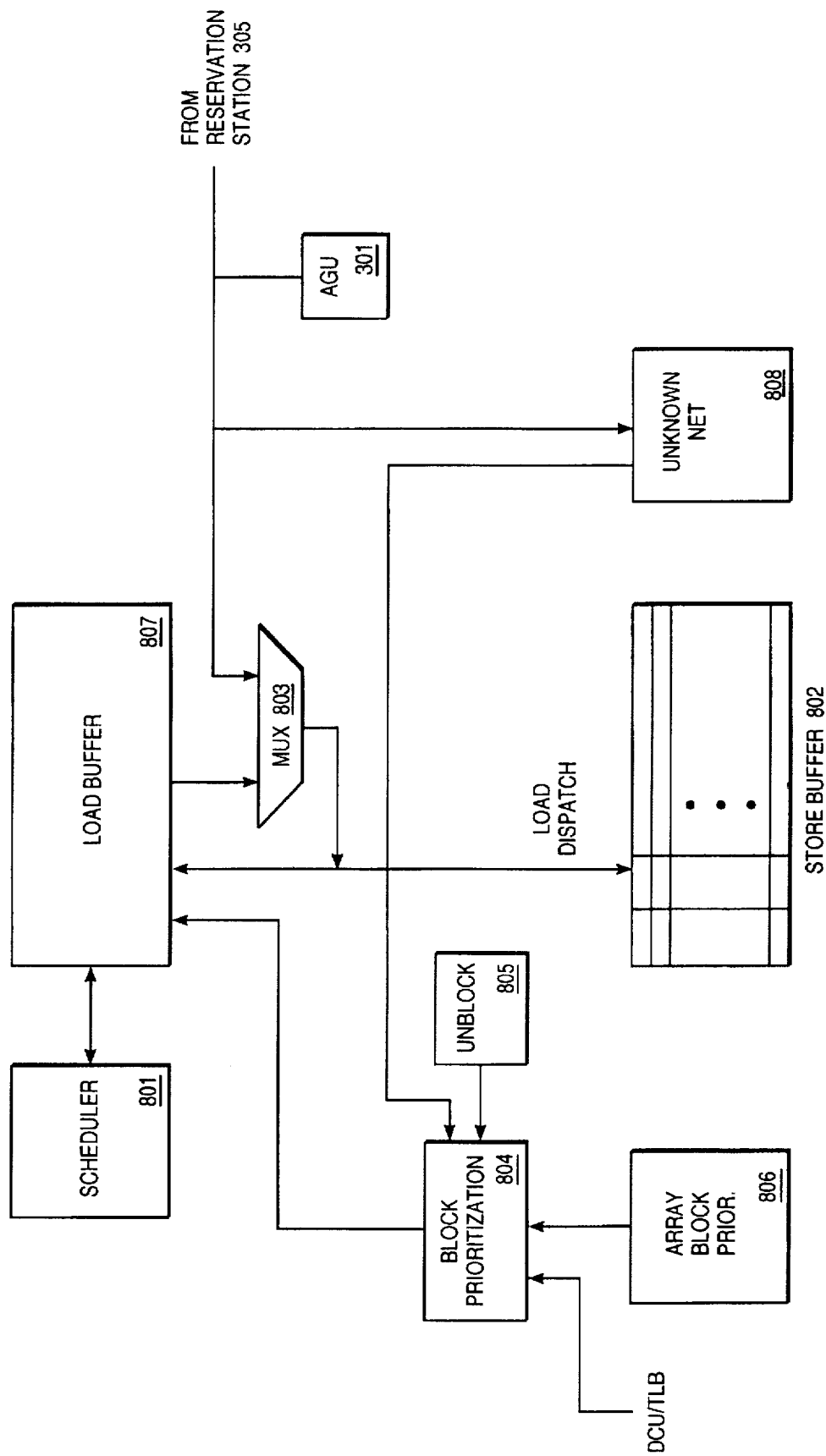
FIG_X

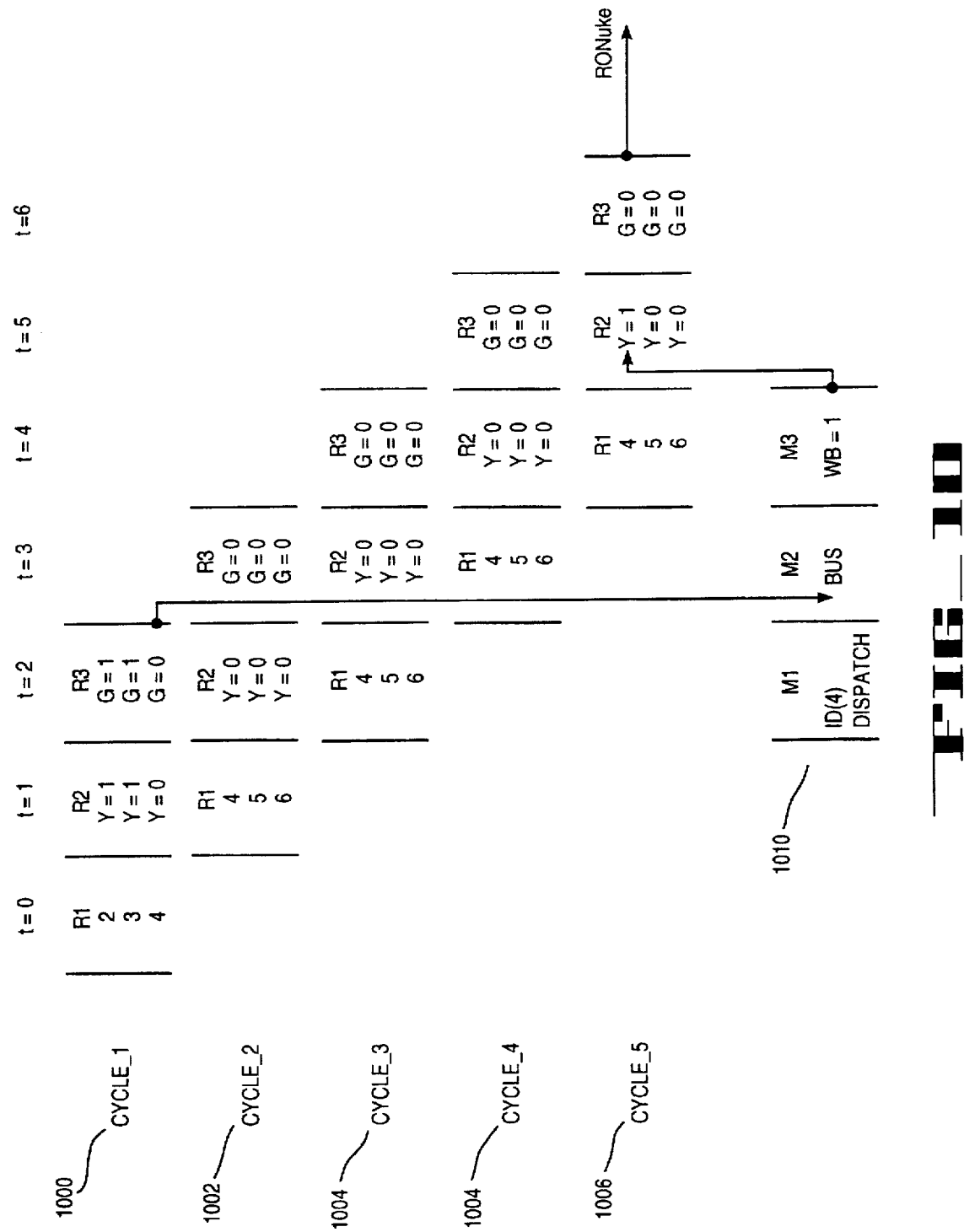

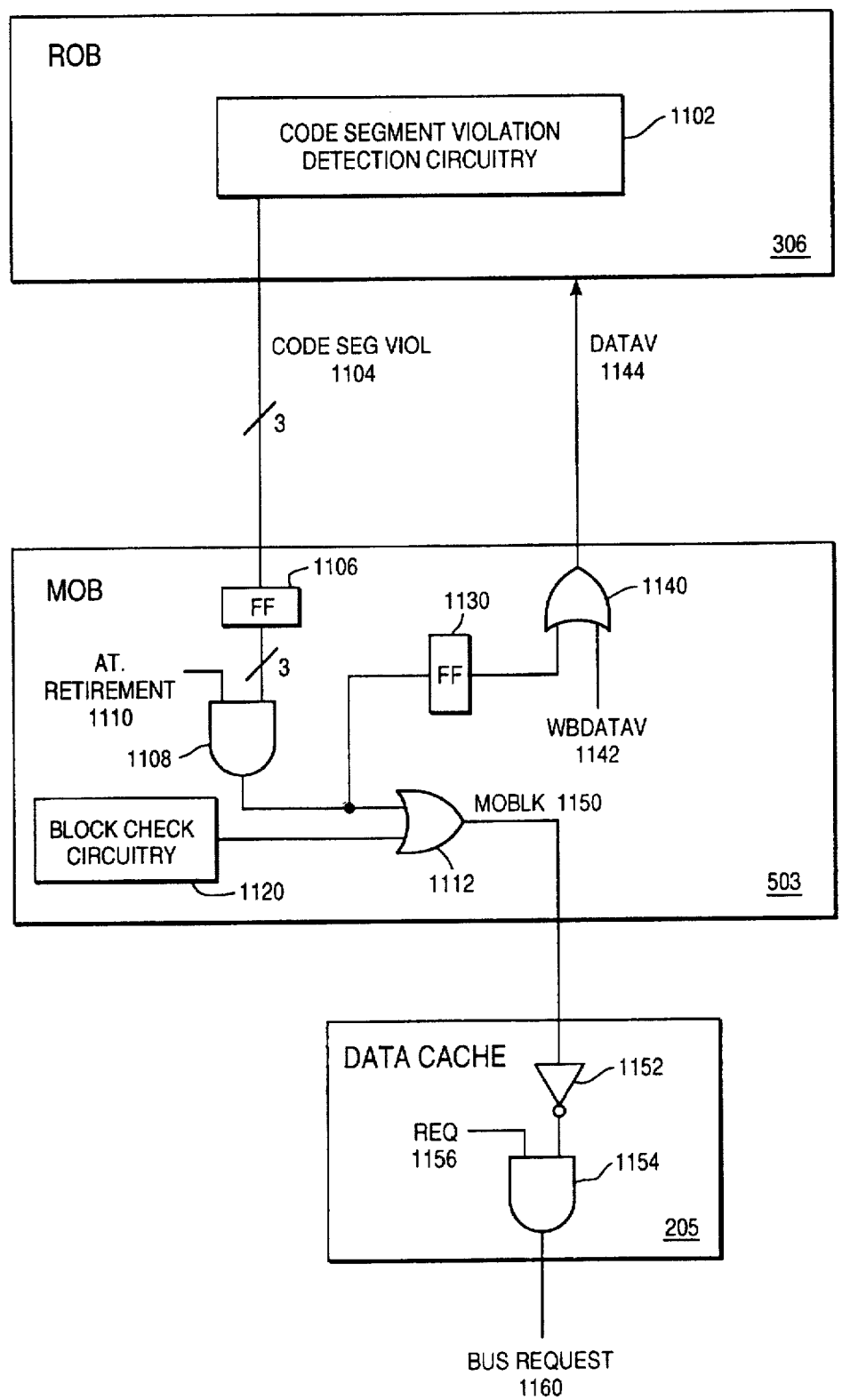
FIG_11

METHOD AND APPARATUS FOR HANDLING CODE SEGMENT VIOLATIONS IN A COMPUTER SYSTEM

FIELD OF THE INVENTION

The present invention relates to the field of computer systems; more particularly, the present invention relates to handling code segment violations in a computer system.

BACKGROUND OF THE INVENTION

A computer system may be divided into three basic blocks: a central processing unit (CPU), memory, and input/output (I/O) units. These blocks are coupled to each other by a bus. An input device, such as a keyboard, mouse, stylus, analog-to-digital converter, etc., is used to input instructions and data into the computer system via an I/O unit. These instructions and data can be stored in memory. The CPU receives the data stored in the memory and processes the data as directed by a set of instructions. The results can be stored back into memory or outputted via the I/O unit to an output device, such as a printer, cathode-ray tube (CRT) display, digital-to-analog converter, etc.

The CPU receives data from memory as a result of performing load operations. Each load operation is typically initiated in response to a load instruction. The load instruction specifies an address to the location in memory at which the desired data is stored. The load instruction also usually specifies the mount of data that is desired. Using the address and the mount of data specified, the memory may be accessed and the desired data obtained.

Similarly, the CPU provides data to memory as a result of performing store operations. Each store operation is typically initiated in response to a store instruction. The store instruction specifies an address to the location in memory at which the desired data is to be provided for storage. The store instruction also usually specifies the mount of data that is provided. Using the address and the amount of data specified, the memory may be accessed for the storage of the data.

The memory accessed in response to the load or store instruction may be the main system memory. Besides including a main system memory, many of today's memory systems also include a cache memory. A cache memory is a very fast local storage memory that is used by a CPU to hold copies of instructions, code or data that are frequently requested from the main memory by the CPU. Memory caches are commonly designed at two levels: a first level cache memory and a second level cache memory. Most recently, the use of third level cache memories has been discussed. The first level cache memory is usually integrated on the same integrated circuit die with the CPU, while the second and third level caches are typically integrated in separate dies, often separate chips. If the memory system includes cache memories, the cache memories are accessed before the main system memory in order to fulfill a load request.

Assuming that a computer system includes first and second level cache memories, when a load instruction is encountered, the CPU initially determines if the data resides in the first level cache. If it does (i.e., a hit), then the data is accessed and the load is completed. If it does not (i.e., a miss), then the CPU sends a request to the second level cache to determine if a copy of the data is currently being stored in the second level cache memory. If a copy of the data is contained within the second level cache memory, the data is returned to the CPU to complete the load and is stored in the first level cache memory. If a copy of the data is not present in the second level cache memory, then the memory request is sent to the main system memory to obtain the desired data. Subsequently, copies of the returned data are stored in both the first and second level cache memories.

Some computer systems have the capabilities to execute instructions out-of-order. In other words, the CPU in the computer system is capable of executing one instruction before a previously issued instruction. This out-of-order execution is permitted because there is no dependency between the two instructions. That is, the subsequently issued instruction does not rely on a previously issued unexecuted instruction for its resulting data or its implemented result. The CPU may also be capable of executing instructions speculatively, wherein conditional branch instructions may cause certain instructions to be fetched and issued based on a prediction of the condition. Therefore, depending on whether the CPU predicted correctly, the CPU will be either executing the correct instructions or not. Branch prediction and its relationship with speculative execution of instructions is well-known in the art. For a detailed explanation of speculative out-of-order execution, see M. Johnson, *Superscalor Microprocessor Design*, Prentice Hall, 1991. Speculative and out-of-order execution offer advantages over the prior art, including better use of resources. If multiple instructions are permitted to be executed at the same time, this performance benefit greatly increases.

Special considerations exist with respect to performing memory operations out-of-order in a computer system. Memory operations are ordered to ensure that the correct data is being transferred. For instance, if a store operation and a load operation have the same destination and source addresses respectively and the store operation precedes the load operation in the instruction stream, then the store operation must occur before the load operation to ensure the correct data will be subsequently loaded. If the load operation is allowed to be completed before the store operation, then the data loaded would more than likely not be the data that the store operation would have stored at the memory location. By using stale data, the computer system will not function as intended by the ordered sequence of instructions. However, out-of-order and concurrent execution of instructions may be very beneficial. Thus, it would be advantageous to execute memory operations out-of-order and concurrently except where their execution would create incorrect results.

Additionally, pipelining is used to speed up the execution of the processor. By employing pipelining, while one instruction is executing, one or more other instructions are initiated such that multiple instructions are processed concurrently. For example, if each instruction takes three cycles to complete. A first instruction may be started in the first cycle. A second instruction may be started in the second cycle, and a third instruction may be started in the third cycle, and so forth. Barring any irregularities, the first instruction will finish in the third cycle. The second instruction will finish in the fourth cycle, and the third instruction will finish in the fifth cycle. Pipelining affords much more efficient usage of the processor than if the instructions were performed serially.

Many computer systems employ segmentation. Segmentation is well known in the art. It is used, for example, to separate one area of data from another area of data. "Data segments" separate various sections of data, and "code segments" separate different sections of code. For example, a first user may be restricted to executing code in a first code segment, and a second user may be restricted to executing code in a second code segment. Additionally, the operating system may use a third code segment. Code segment violations are also well known in the art, and will not be discussed in detail. They are caused, for example, by a user trying to execute code that is in a segment to which the user has restricted access. For more information about segmentation and segmentation violations, please refer, for example, to the Intel486™ Microprocessor Family Programmer's Reference Manual (1992), published by Intel Corporation.

SUMMARY OF THE INVENTION

A method and apparatus for handling code segment violations in a computer system is described. The computer system includes a processor. The processor issues a memory operation. Upon detecting both that the memory operation produces a code segment violation and that the memory operation is blocked at retirement, a blocking signal is produced to block a bus access responsive to the memory operation. A second signal signifies that the memory operation completed. Thereafter, the instruction stream is flushed.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 is a flow diagram illustrating the process of the present invention.

FIG. 2A is a block diagram of the computer system of the present invention.

FIG. 2B is a block diagram of the memory subsystem of the present invention.

FIG. 3 is a block diagram of one embodiment of the execution unit of the present invention.

FIG. 4 illustrates an example of one embodiment of the addressing scheme of the present invention.

FIG. 5 is a block diagram of the relevant portions of the cache controller of the present invention.

FIG. 6 is a block diagram of the relevant portions of the data cache of the present invention.

FIG. 7 is a block diagram of the relevant portions of memory interface unit of the present invention.

FIG. 8 is a block diagram of the relevant portions of the memory order system of the present invention.

FIG. 10 is a timing diagram of the execution of a memory operation according to the present invention.

FIG. 11 is a block diagram of the circuitry used to block a memory access in the case of a code segment violation occurring on a memory operation being issued.

DETAILED DESCRIPTION OF THE PRESENT INVENTION

Figure 9:
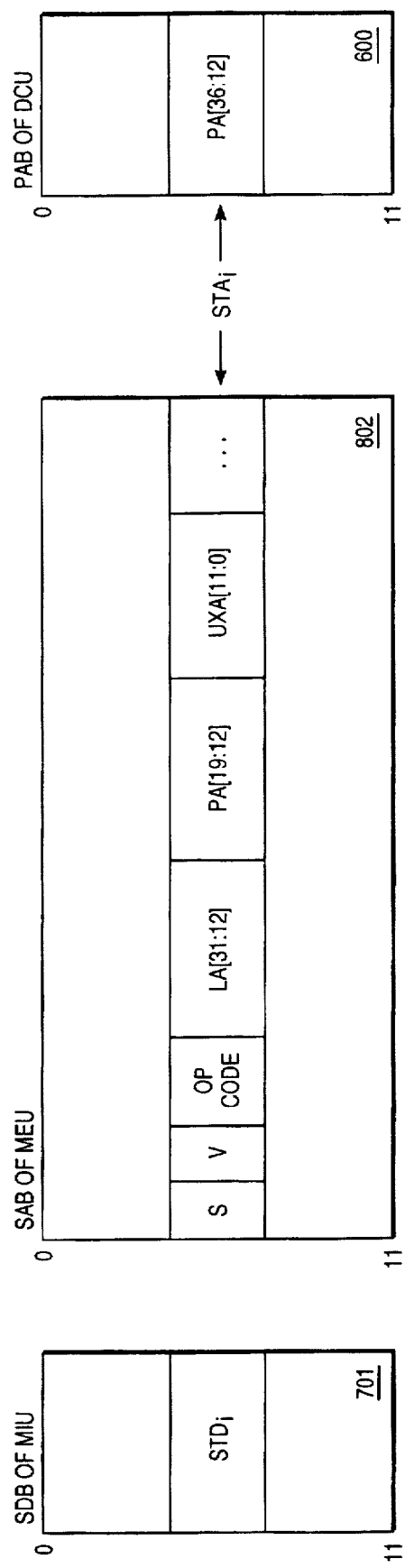
FIG. 9 is a block diagram depicting the interaction between the store address buffer the store data buffer and the physical address buffer.

A method and apparatus for handling code segment violations is described. In the following detailed description of the present invention numerous specific details are set forth, such as specific number of bits, address sizes, blocking conditions, etc., in order to provide a thorough understanding of the present invention. However, it will be obvious to one skilled in the art that the present invention may be practiced without these specific details. In other instances, well-known structures and devices are shown in block diagram form, rather than in detail, in order to avoid unnecessarily obscuring the present invention.

Overview of the Present Invention

The present invention includes a process and mechanism for handling code segment violations. The present invention performs the load operations and store operations in response to load instructions and store instructions, respectively, executed in the computer system. The load instructions and store instructions, collectively referred to as memory operations, are received and executed by a processor in the computer system.

The process for handling a code segment violation in the present invention is depicted in the flow diagram of FIG. 1. Referring to FIG. 1, a memory operation is issued at block 102. In the present invention, a reservation station (RS) issues the instruction, as will be described later. At block 104, the memory operation is blocked until retirement. Memory operations can be blocked until retirement for several reasons, as will be described later with reference to FIG. 10. However, memory operations are not always blocked until retirement. For this reason, block 104 is optional in the flow diagram of FIG. 1.

The flow diagram continues at block 106, in which a determination is made as to whether the memory operation is blocked at retirement. If the memory operation is not blocked at retirement, then operation continues at block 108, in which the memory operation is executed normally. However, if the memory operation is blocked at retirement, then processing continues at block 110.

Code segment circuitry determines whether a code segment violation occurred due to the memory operation at block 110. If there was no code segment violation, then operation continues at the block 108, in which the memory operation is executed normally. However, if there was a code segment violation, then operation continues at a block 112.

A bus request corresponding to the memory operation is blocked at block 112. Additionally, a signal is provided indicating that the memory operation completed at block 114. In one embodiment, this signal is provided to a reorder buffer and to the reservation station which originally issued the instruction. Thereafter, a general abort flushes the entire instruction stream at block 118.

Overview of the Computer System of the Present Invention

Referring to FIG. 2A, the computer system upon which a preferred embodiment of the present invention is implemented is shown as 200. Computer system 200 comprises a bus or other communication means 211 for communicating information, and a processing means 212 coupled with bus 211 for processing information. Processor 212 includes, but is not limited to microprocessors such as an Intel Architecture Microprocessor, manufactured by Intel Corporation of Santa Clara, Calif., the corporate assignee of the present invention. Processor 212 may also be another microprocessor such as the PowerPC™, Alpha™, etc. System 200 further comprises a random access memory (RAM) or other dynamic storage device 214 (referred to as main memory), coupled to bus 211 for storing information and instructions to be executed by processor 212. Main memory 214 also may be used for storing temporary variables or other intermediate information during execution of instructions by processor 212. Computer system 200 also comprises a read only memory (ROM) and/or other static storage device 216 coupled to bus 211 for storing static information and instructions for processor 212, and a data storage device 217 such as a magnetic disk or optical disk and its corresponding disk drive. Data storage device 217 is coupled to bus 211 for storing information and instructions.

Computer system 200 may further be coupled to a display device 221, such as a cathode ray tube (CRT) or liquid crystal display (LCD) coupled to bus 211 for displaying information to a computer user. An alphanumeric input device 222, including alphanumeric and other keys, may also be coupled to bus 211 for communicating information and command selections to processor 212. An additional user input device is cursor control 223, such as a mouse, a trackball, stylus, or cursor direction keys, coupled to bus 211 for communicating direction information and command selections to processor 212, and for controlling cursor movement on display 211. Another device which may be coupled to bus 211 is hard copy device 224 which may be used for printing instructions, data, or other information on a medium such as paper, film, or similar types of media. Furthermore, a sound recording and playback device, such as a speaker and microphone may optionally be coupled to bus 211 for interfacing with computer system 200. Note that any or all of the components of system 200 and associated hardware may be used in a preferred embodiment, however, it can be appreciated that any type of configuration of the system may be used for various purposes as the user requires.

FIG. 2B is a block diagram of the memory subsystem of the computer system of the present invention. Referring to FIG. 2B, the memory subsystem comprises an instruction fetch and issue unit 201 with an integrated instruction cache 202, an execution core 203, a bus controller 204, a data cache memory 205, a memory unit 207, and a bus 208.

The memory unit 207 is coupled to the system bus. The bus controller 204 is coupled to the bus 208. The bus controller 204 is also coupled to the data cache memory 205 and the instruction fetch and issue unit 201. The instruction fetch and issue unit 201 is also coupled to the execution core 203. The execution core 203 is also coupled to the data cache memory 205. In the present invention, the instruction fetch and issue unit 201, the execution core 203, the bus controller 204, and the data cache memory 205 together comprise the processor 212 (FIG. 2A). In the present invention, elements 201-205 cooperate to fetch, issue, execute and save the execution results of instructions in a pipelined manner.

The instruction fetch and issue unit 201 fetches instructions from an external memory, such as memory unit 207, through the bus controller 204 via bus 208, or any other external bus. The fetched instructions are stored in instruction cache 202. The bus controller 204 manages transfers of data between external components and the processor 102. In addition, it manages cache coherency transfers. The instruction fetch and issue unit 201 issues these instructions in order to the execution core 203. The execution core 203 performs arithmetic and logic operations, such functions as add, subtract, logical AND, and integer multiply, as well as memory operations. Some instructions are fetch and issued speculatively.

The execution core 203 includes an execution unit that holds and executes the integer and floating point instructions when their operand dependencies on execution results of preceding instructions are resolved, including those integer and floating point instructions that are speculatively fetched and issued. Similarly, the execution core 203 also includes a memory execution unit that holds, executes and dispatches load and store instructions to the data cache memory 205 (as well as external memory) as soon as their operand dependencies on execution results of preceding instructions are resolved, including those load and store instructions that are speculatively fetched and issued.

The data cache memory 205 respond to the load instructions immediately, forwarding data if necessary, whereas the store instructions are buffered. In other words, the instructions are not necessarily executed/forward in the order they were issued, and some instructions are speculatively executed/forwarded. However, the execution results of the integer, floating point and load instructions are buffered, and then committed to processor state in program order. The buffered store instructions are committed to processor state in program order and then executed in the "background", at the convenience of the memory system. Speculative integer, floating point and load execution results and buffer stores of mis-predicted branches are purged. Note that the speculative nature of fetched, issued and executed instructions is attributed to the uncertainty of whether a particular instruction or set of instructions is to be executed due to an unaffirmed branch prediction.

Instruction fetch and issue unit 201 is intended to represent a broad category of instruction fetching and issuing elements found in many computer systems. Their constitutions and functions are well-known and will be described only as necessary with reference to later figures.

The bus controller 204, the bus 208, and the memory 207 are also intended to represent a broad category of these elements found in most computer systems. Their functions and constitutions are well-known and will not be described further. The execution core 203, incorporating with the teachings of the present invention, and the data cache memory 205 will be described further in detail below with additional references to the remaining figures.

FIG. 3 is a block diagram of one embodiment of the execution core of the present invention. Referring to FIG. 3, execution core 203 comprises a reservation station (RS) 305, a memory execution unit MEU 300, an integer execution unit (IEU) 302, a floating point execution unit (FEU) 303, a memory interface unit (MIU) 304, a reorder buffer (ROB) and real register file (RRF) 306. Additionally, execution core 203 includes an internal bus (Bus_EU) 307 and a writeback bus 308. MEU 300, an address generation unit (AGU) 301 (shown in FIG. 5), IEU 302, FEU 303 and MIU 304 are all coupled to reservation station 305 via a dispatch bus 309. They are also coupled to writeback bus 308. MIU 304 is also coupled to the data cache memory and MEU 300 via bus 310. RS 305 is coupled to the writeback bus 308 and the Bus_EU 307. RS 305 is also coupled to ROB and RRF 306. ROB and RRF 306 is also coupled to the Bus_EU 307 and the writeback bus 308. Together, elements 300-310 are coupled to hold, dispatch, execute and commit execution results of instructions, whereas described earlier, the dispatching and execution of instructions are not necessarily in the order the instructions are issued. That is, the instructions could be dispatched and executed out-of-order. Execution core 203 may include multiple IEUs, such as two, and multiple FEUs, such as two.

Reservation station 305 receives and stores the issued instructions resolving their operands with data from the IEU 302, the FEU 303, the data cache memory, the ROB and RRF 306 and holds them until their operands are all resolved. The RS 305 then dispatches the issued instructions to the AGU 301, the IEU 302, the FEU 303 and the MIU 304 and the MEU 300 as appropriate.

In particular, the load instruction is dispatched as a single operation, whereas the store instruction is dispatched as store address (STA) and stored data (STD) operations to the MEU 300 and MIU 304. Similar to instruction fetching, there is no requirement that the load sources or the store destinations be aligned to memory locations. In other words, the load sources of load instructions and store destinations of store instructions may span two cache lines (or two pages).

The MEU 300, the IEU 302, FEU 303, and the MIU 304 in turn perform their operations accordingly. The execution results of the integer, floating point and load instructions are held in the ROB 306, and then committed by RRF 306 in the order these instructions were issued. Speculative execution results of the mispredicted branches are not committed, but instead are held in the ROB 306 and purged upon their detections.

FIG. 5 depicts a block diagram of the relevant portions of one embodiment of the memory execution unit (MEU) of the present invention. Referring to FIG. 5, the MEU 205 includes AGU 301, page miss handler (PMH) 501, memory order buffer (MOB) 503, and translation lookaside buffer (TLB) 504, as well as memory dispatch bus 502 and the writeback bus 308. PMH 501 is coupled to the memory dispatch bus 502, writeback bus 308, and TLB 504. MOB 503 is coupled to the reservation station, memory dispatch bus 502, writeback bus 308, the data cache memory 205 and TLB 504. TLB 504 is also coupled to memory dispatch bus 502, writeback bus 308 and the data cache memory 205. Memory dispatch bus 502 and writeback bus 308 are also coupled to the data cache memory. AGU 301 is coupled to MOB 503, the writeback bus 308, and the dispatch bus 309.

The AGU 301, MOB 503, PMH 501, and TLB 504 control all load accesses to the data cache memory and, in turn, the memory of the computer system. The AGU 301, MOB 503, PMH 501, and TLB 504 also execute the STA portion of the store. Specifically, MOB 503 buffers the results of the STA execution for the eventual store dispatch to the data cache memory.

The AGU 301 generates the appropriate linear address for the memory operations. The AGU 301 computes the linear address using a base address, a displacement value, a scale value, an index value and a segment value. In one embodiment, the linear address is 32-bits long with the twenty higher order bits identifying a memory page and the twelve low order bits identifying the off-set within the memory page. An example of such an addressing scheme is shown in FIG. 4.

TLB 504 translates the 32-bit linear address into a 36-bit physical address with 24 higher order bits indicating the memory page, as shown in FIG. 4, and forwards misses to PMH 501. In response, PMH 501 performs page walking and other well-known page miss handling functions. The MOB 503, incorporated with the teachings of the present invention, controls dispatching, buffers all store and load operations, tracks their progress as they move through execution, and then retires/commits them to permanent architectural state as appropriate. MOB 503 then causes the retired/committed stores to be executed in due course "background" at the convenience of the memory system.

Additionally, MOB 503 responds to load operations by forwarding buffered data as necessary. When an operation is dispatched and cannot complete due to some address or resource conflict, MOB 503 blocks the operation and stores the dependency information. MOB 503 redispatches blocked operations when the blocking source is removed. Some memory operations cannot execute speculatively, MOB 503 controls the necessary monitoring and dispatches these non-speculative operations at the correct time. For instance, MOB 503 snoops the source addresses of instructions fetched and generates a single stall signal for the bus controller to stall an instruction fetch whenever the source address instruction being fetched substantially matches any of the addresses of the store destinations of the buffered stored instructions.

The TLB 504 and the PMH 501 are intended to represent a broad category of these elements found in most computer systems. MOB 503 will be described in further detail below with additional references to the remaining figures.

FIG. 6 is a block diagram of one embodiment of the data cache memory of the present invention. Referring to FIG. 6, the data cache memory 205 comprises a physical address buffer (PAB) 600, data tag array 601 and a data array 602 and queue 603. PAB 600 is coupled to receive an input (e.g., the physical address) from the TLB of the MEU and is coupled to produce a physical address to tag array 601. Tag array 601 is coupled to receive an input (e.g., either store address or load address) from the MOB of the MEU. Data array 602 is coupled to receive an input from tag array 601 and the store data buffer (SDB) of the MEU, as well as being coupled to the bus controller. In response, data array 602 produces an output to the execution core. Queue 603 is also coupled to tag array 601 and data array 602. Queue 603 is also coupled to receive an input from the MOB as well as the bus controller.

The PAB 600 receives and saves the 24 high order bits of the translated physical addresses from the TLB of the MEU for the store and load operations, and in cooperation with the MOB and MIU, commits them to processor state and executes them as appropriate. Data tag array 601 stores the physical address tags of the data currently being cached in data array 602 and tag matches the accessing physical addresses against the stored physical address tags. Data array 602 receives and stores the data currently being cached and responds to data loads. In one embodiment, data tag array 601 and data array 602 have sufficient capacity for storing 128 sets of 2-way set associative 32-byte cache lines of data and their corresponding address tags. PAB 600, in cooperation with the MOB of the data cache controller, will be discussed in further detail below. TAG array 601 and data array 602 are intended to represent a broad category of these elements found in most computer systems, whose functions and constitutions are well-known and will not be further described.

Queue 603 contains accesses to data cache memory 205 that miss the cache memory and are currently pending on the bus. The entries in queue 603 are also checked where the data cache memory is accessed to determine if the desired data is stored in one of its entries or there is a request for that cache line currently pending on the bus. Queue 603 includes storage locations for temporarily storing the data returned for those pending operations. Queue 603 supplies the data and its tag information to data array 602 and tag array 601 respectively. In one embodiment, the queue 603 includes four entries having a 256 bit width (one cache line).

FIG. 7 is a block diagram of one embodiment of the relevant portions of the MIU of the execution unit of the present invention. Referring to FIG. 7, the MIU 304 comprises a store converter (STC) 700 and a store data buffer (SDB) 701, coupled to each other, such that store converter 700 receives data from the reservation station of the execution unit and sends data to SDB 701. SDB 701 then sends the data onto the data cache memory.

The STC 700 converts the floating point data of the STD operations. The SDB 701 receives and stores the STD operations and in cooperation with the store address buffer (SAB) of the data cache controller, and the PAB of the data cache, retires/commits the STD operations as appropriate, and causes them to be executed. The functions and constitutions of the STC 700 are well-known and will not be further described. SDB 701 and its cooperation with the SAB and PAB, will be described in further detail below.

FIG. 8 is a block diagram of one embodiment of the relevant portions of the memory order buffer (MOB). Referring to FIG. 8, the MOB comprises scheduler 801, load buffer (LB) 807, multiplexer (MUX) 803, block prioritization logic 804, unconditional block 805, array block prioritization 806, store buffer 802, and unknown net block 808. Scheduler 801 is coupled to load buffer 807. Load buffer 807 is coupled to block prioritization 804, store buffer 802 and MUX 803. Block prioritization logic 804 is also coupled to receive an input from the TLB and the data cache memory, unknown net 808, array block prioritization 806 and unconditional block 805. Unknown net 808 and MUX 803 are also coupled to the reservation station via the dispatch bus.

The SAB 802 stores the remaining operands and partial replications of the page denoting portions of the store destination addresses of buffered STA operations. The SAB 802, in cooperation with the SDB of the MIU and the PAB of the data cache memory, retires/commits the STA operations as appropriate, and causes them to be dispatched.

LB 807 also is coupled to receive a copy of the load operations dispatched from the RS via MUX 803. Load operations are copied into LB 807. LB 807 provides the stored load operations to the TLB and the execution pipe upon dispatch. MUX 803 receives loads from load buffer 807 and from the dispatch bus and outputs one for dispatch to memory.

Unknown net 808, unconditional block 805 and array block prioritization 806 determine if a specific set of condition exist that would cause or require a particular load operation to be prevented from executing. Each of these will be described below later. Block prioritization logic 804 receives conflicts/conditions/identification signals to block load and initiate operations stored in LB 807. Block prioritization logic indicates the status of load operations through signals sent to LB 807. Scheduler 801 schedules load operations for dispatch to memory based on their status.

FIG. 9 is a block diagram of one embodiment of the PAB, the SDB and the SAB. The PAB 600, the SDB 701 and SAB 802 all comprise an equal number of buffer slots. In one embodiment, up to a maximum of 12 buffer slots are included. The STD and STA operations of the store instructions are stored in corresponding buffer slots of the PAB 600, SDB 701 and SAB 802. More specifically, the 24 high order bits of the physical address (PA[36:12]) are stored in the buffer slot in the PAB 600. The STD operation is stored in a corresponding buffer slot in the SDB 701. The STA operation, including the valid bit, the OP code, the 20 high order bits of the linear address (LA[31:12]), and the 12 page offset designating bits of the address (UXA[11:0]), is stored in a corresponding buffer slot in the SAB 802. Additionally, the 8 lower order bits of a page designated portion of the physical address (PA[19:12]) of the STA operation are replicated in the buffer slot in the SAB 802. The STD and STA operations of most store operations are promoted to a "senior" state, i.e. ready for retirement or commitment, in due course, when their respective preceding instructions have been retired/committed or promoted to the "senior" state. The "senior" STD and STA operations are then executed in the "background" in due course when the data cache is free and then purged from the SDB 701, the SAB 802 and the PAB 600. The STD and STA operations of some of the store instructions, such as those storing data to memory locations mapped to I/O devices, are not eligible to be promoted to the "senior" state. The store data and store operations of these store instructions are retired/committed, and purged from the SDB 701, the SAB 802 and the PAB 600 concurrent with their executions. In other words, when the target I/O devices are ready to accept the data being "stored", then the execution occurs. In one embodiment, the linear addresses are driven from the SAB 802 to the TLB again, and the newly generated PA is directly provided to the tag array of the data cache, bypassing the PAB of the data cache memory. Additionally, if a store instruction involves storing data to memory locations spanning two cache lines, the data cache controller signals the data cache memory, and the STD and STA operations are driven to the data cache memory twice, with the data size and the physical address being adjusted accordingly the second time.

Performing Load Operations

In the present invention, a load operation is performed in response to a load instruction. The load instruction is received by the instruction fetch and issue unit which decodes the load instruction. The issue and fetch unit sends the decoded load operation to the reservation station for dispatch to the memory subsystem when any data dependencies between the load operation and other microoperations are resolved.

Once in the memory subsystem, the linear address for the load can be either bypassed directly from the AGU or can come from the MOB load buffer. The upper 20 bits of the linear address are translated by the DTLB into a physical address. The data cache memory uses these physical address bits along with the lower 12 bits of the untranslated address to do a tag array look-up and data array read (if needed). If the load hits the cache memory, then the data is read out of the data cache memory data array, aligned and then passed on to a load converter (not shown to avoid obscuring the present invention). The load converter then converts the data into the proper internal format recognized by the processor and writes it back on the writeback bus. If the load misses the data cache memory, a request for data will be made to the bus controller. After the data is retrieved by the bus controller, either from an L2 cache memory or external memory, the data cache memory requests a cycle on the writeback bus to return the requested data. When the data cache memory has received a grant for a cycle or the writeback bus, it forwards its data to the load converter which drives it on the writeback bus after format conversion.

When performing load operations in the present invention, the load operation is dispatched for execution to the memory subsystem. Once a load operation has been dispatched, the data cache memory and the DTLB also begin providing a blocking status, while the MOB detects one or more address conflicts. Using the blocking status condition and the address conflict information, the MOB prioritizes the conditions and conflicts to determine if the load operation should be allowed to continue in execution. If the load cannot be completed due to a conflict, it is halted, or blocked. That is, the DCU aborts the load request. In this case, the MOB creates a block code identifying the event that must occur, if any, before the load can be completed. Once the appropriate event has been observed, the load operation may "wake up" and be redispatched for execution.

Once a load has been awakened, there is no guarantee that it will complete during the next execution cycle The load operation may not complete because it may be blocked again for the same or different reasons. For example, a load may be blocked by the MOB on its initial dispatch because of an address conflict with a store operation that has been dispatched previously and is currently pending. When the operation that generates that address is dispatched, the load operation is awakened and redispatched. The redispatched load may be blocked by the data cache memory due to a pending load operation for the same cache line for a different load currently executing in the system. When the appropriate data is returned, the load operation will wake up and be redispatched. Once redispatched, the load may block again, or complete with returned data.

The load operations that are blocked are stored in the load buffer. In one embodiment, the load buffer contains sixteen entries. Therefore, at most 16 load operations can be pending in the processor at any one time. As many as 16 load operations may "wake up" in a given cycle. Since only one load is dispatched every cycle (in the preferred embodiment), the MOB must queue the load operations that are awake for dispatch. Queuing is performed by the load buffer by tagging loads as "ready" when they wake up. The load buffer then schedules for dispatch one of the "ready" loads each cycle. This ready/schedule mechanism allows the throughput of one load scheduled per cycle.

Thus, the memory of the system is organized such that it receives the loads dispatched to the memory subsystem one per cycle. The MOB performs multiple load blocking checks during this time to determine if load can be executed without conflicts (since the reservation station dispatches purely on data dependency). Checking for address and resource dependencies, the MOB gathers all the blocking conditions and prioritizes them to determine the highest priority. The load operation is stored and tagged with the block code and prevented from completion if a conflict exists (e.g., it is blocked). The operation of the memory system is monitored to determine when the conditions causing a particular load to be block no longer exist. At this time, the load is allowed to redispatch.

Uncacheable memory operations

Uncacheable memory operations can be destructive to memory when executed. These uncacheable loads and stores are also known as side-effect loads and stores. Once one of these loads or stores is performed, the effects are often not correctable. For this reason, uncacheable loads and stores cannot be performed speculatively. For example, if an uncacheable load is performed to the memory subsystem, this could cause the data stored in the memory subsystem at the indicated address to change values. The uncacheable load could also cause other non-recoverable side effects including changing other memory locations, changing page tables, etc.

In order to simplify the complexity of maintaining ordering within the processor, uncacheable loads and stores are blocked until retirement. That is, they are blocked until all operations previous to the uncacheable load or store are executed to the point that they have updated the processor state.

FIG. 10 shows a timing diagram of the retirement process of the ROB 306. In one embodiment, the retirement process is performed in a three stage pipeline. In the first stage, the ROB determines the three oldest operations. The ROB accomplishes this by use of a pointer which points to the oldest operation. In the second stage, the valid status of each of the three oldest operations is determined. If the valid status of an operation is positive then that operation has completed and data was written back successfully for that operation. In the third stage, the guarantee status of each of the three oldest operations is determined. An operation will retire if that operation's valid status and guarantee status are both positive.

An example will help illustrate. Table 1 shows a sequence of instructions which are to be retired. An arbitrary operation number is assigned to each operation to be performed. Operation 4 is a load which has a side effect.

TABLE 1

| operation number | operation |
|---|---|
| 2 | x = a * b |
| 3 | y = c * d |
| 4 | z = ld q (side effect) |
| 5 | x = a + b |
| 6 | y = a − b |

Referring to FIG. 10, the timing diagram begins with a cycle__1 1000 which starts at time t=0. For cycle__1, the retirement process comprises the three pipeline stages R1, R2, and R3, which are at times t=0, t=1, and t=2, respectively. At pipeline stage R1, the three oldest operations are determined. At pipeline stage R2, the valid status for each of the operations is determined and represented as a valid bit. For cycle__1, the valid bits for operations 2 and 3 are positive, or 1, and the valid bit for operation 4 is negative, or 0. The valid bit for operation 4 is blocked until retirement since operation 4 is an uncacheable load. At the pipeline stage R3, the guarantee status is determined. It is represented as a guarantee bit. The guarantee bit includes checks for faults, branch mispredictions, interrupts and other exceptions. The guarantee bit is serial in that the guarantee bit of the second operation can only be positive if the guarantee bit of the first operation is positive. Additionally, the guarantee bit of the third operation can only be positive if the guarantee bits of both the first and second operations are positive. In one embodiment, for a given operation, if the valid bit is 1 but the guarantee bit is 0, then a RONuke abort is asserted which flushes the pending instruction stream from the ROB. This might happen, for example, if a branch misprediction occurred such that the speculative instruction stream was incorrectly predicted, and thus, no longer needed.

In cycle__2 1002, the three pipeline stages R1, R2, and R3 span from time t=1 to time t=3. In the pipeline stage R1, the next three operations which are to be retired are determined to be operation 4, operation 5, and operation 6. Operation 2 and operation 3 have already retired such that their results have updated the processor state. Operation 4, which is an uncacheable load, is now woken up at retirement. In the pipeline stage R2, the valid bits for each of the operations is determined. For operation 4, the valid bit will remain 0 until after data is written back from the memory system. In one embodiment, the valid bits are serially determined, such that the valid bits for operations 5 and 6 may not become 1 until the valid bit for operation 4 becomes a 1. In the pipeline stage R3, the guarantee bits are determined for the three operations.

At cycle__3 1004, the retirement pipeline spans from time t=2 to time t=4. At cycle__4 1006, the retirement pipeline spans from time t=3 to time t=5. However, there is no change in the valid or guarantee bits in either cycle__3 1004 or cycle__4 1006.

Additionally starting at time t=2, a memory operation 1010 is started. If there is no code segment violation, the following procedures would follow: This memory operation 1010 has three pipeline stages, M1, M2, and M3. At pipeline stage M1, the load for operation 4 is dispatched from the ROB to the MOB. At pipeline stage M2, the operation 4 proceeds on the bus to retrieve data from the memory subsystem. At pipeline stage M3, the data is written back to the processor from the memory subsystem.

Code segment violation checking is initiated on operation 4 once operation 4 begins to retire. In FIG. 10, the code segment violation checking of operation 4 begins during the R3 stage of cycle_1 1000 at time t=2. If a code segment violation is detected, then a signal is provided to the DCU which aborts the bus access at pipeline stage M2 at time t=3, as shown in FIG. 10. In one embodiment of the invention, although data is not written back to the processor from the memory subsystem, a writeback signal is provided from the memory pipeline stage M3 to provide a valid bit of 1 to the R2 pipeline stage of cycle_5 at time t=5. By forcing the valid bit to 1, with a corresponding guarantee bit of 0 due to the code segment violation, a RONuke abort results which subsequently flushes the rest of the instruction stream from the ROB.

The same timing as shown in FIG. 10 applies to all loads and stores which are blocked until retirement. This includes loads and stores which are misaligned along a cache line boundary. It also includes stores that block on the initial STA execution.

Loads and stores that are misaligned along a cache line boundary refer to loads and stores that access a data item which is contained partially in one cache line and partially in the subsequent cache line. In one embodiment, if a memory operation is performed on one cache line, the processor makes sure that a memory operation will also happen to the subsequent cache line. To simplify keeping track of address overlaps with other pending loads and stores, the loads and stores that are misaligned along the cache line boundary are blocked until retirement. All previous loads and stores will have updated the processor state by the time that the cache line-misaligned loads and stores are woken up.

Stores that block on their initial STA execution, i.e., determination of the store address, are also blocked until retirement. Stores, as compared to loads, are usually not time critical. For example, if a load is blocked upon its initial execution, the processor may stall because it needs the data from the load to perform a subsequent operation. The processor will retry the load with little delay. However, if a store is blocked for some reason upon its initial execution, a slightly longer delay normally will not matter. Thus, in one embodiment, whenever a store is blocked upon its initial execution, for example, due to a page miss or the instruction fetch unit being busy, the store is blocked until retirement.

For more details on blocking and waking up stores and loads, please refer to the patent application Ser. No. 08/176,804, entitled "Method and Apparatus for Performing Load Operations in a Computer System", filed Jan. 4, 1994, and incorporated herein by reference, which application is assigned to assignee of the present invention.

FIG. 11 shows a block diagram of the circuitry used to block a memory access in the case of a code segment violation occurring on a memory operation being issued. The ROB 306 includes code segment violation detection circuitry 1102. This code segment violation detection circuitry provides one CODESEGVIOL signal 1104 for each of the operations which are up for retirement. In the described embodiment, since there are three operations up for retirement in each cycle, there are three CODESEGVIOL signals 1104. These three CODESEGVIOL signals are provided to a flip-flop 1106 inside the MOB 503. The output of the flip-flop 1106 is an input to an AND gate 1108. Additionally, an at-retirement signal 1110 is input to the AND gate 1108. The at-retirement signal 1110 and the flip-flop 1106 are logically ANDed together. Thus, if there is a code segment violation and the operation is at-retirement, then the output of AND gate 1108 will be asserted.

The output of the AND gate 1108 is coupled to the input of an OR gate 1112. Block checking circuitry 1120 provides a signal as an input to OR gate 1112. Block checking circuitry 1120 will assert a signal to the OR gate 1112 if an operation is to be blocked.

The output of the AND gate 1108 is also coupled to the input of a flip-flop 1130. The output of the flip-flop 1130 is input to an OR gate 1140. A WBDATAV signal 1142 is also provided as an input to the OR gate 1140. The WBDATAV signal 1142 is asserted when a load or store operation is written back successfully. The output of the OR gate 1140 provides a DATAV signal 1144 to the ROB 306. The DATAV signal indicates that the load or store operation completed successfully.

The output of the OR gate 1112 provides a MOBLK signal 1150 to the data cache 205. The MOBLK signal 1150 is negated by an inverter 1152 then routed to an AND gate 1154. REQ signal 1156 is also provided as an input to the AND gate 1154 to indicate that there is a bus request. The output of the AND gate 1154 provides a BUSREQUEST signal 1160.

If the code segment violation detection circuitry detects a code segment violation, it will assert one or more of the CODESEGVIOL signals 1104. This signal will be propagated by flip-flop 1106 to the AND gate 1108 where it is logically ANDed with the at-retirement signal 1110. The output of the AND gate 1108 will be asserted if a code segment was detected and the load or store operation was blocked at-retirement. If the output of the AND gate 1108 is asserted this will cause the output of the OR gate 1112, MOBLK 1150, to also be asserted. The MOBLK signal 1150 is negated by inverted 1152 and logically ANDed with the REQ signal 1156. The negated MOBLK signal will prevent a BUSREQUEST signal 1160 from being asserted. This will prevent a bus access occurring on system bus 211.

If the output of the AND gate 1108 is asserted, then this signal is also propagated through flip-flop 1130 to the OR gate 1140, causing OR gate 1140 to assert the DATAV signal 1144. The DATAV signal 1144 is routed to the ROB 306.

However, if the requirement of both a CODESEGVIOL signal 1104 being asserted and the at-retirement signal being asserted is not met, then the output of the AND gate 1108 will not be asserted. In this case, operation will behave like a normal memory operation. The blocking check circuitry 1120 will still be able to cause a bus request from occurring by asserting a signal to the OR gate 1112 which will assert MOBLK 1150. Similarly, if there is no blocking condition occurring and MOBLK is not asserted, then any bus requests signified by REQ signal 1156 will be passed through the OR gate 1154 such that the BUSREQUEST signal 1160 is asserted correspondingly. Additionally, whenever WBDATAV 1142 is asserted to OR gate 1140, a DATAV signal 1144 is provided to the ROB 306.

Thus, an apparatus and method for handling code segment violations in a highly pipelined processor is disclosed. The specific arrangements and methods described herein are merely illustrative of the principles of this invention. Numerous modifications in form and detail may be made without departing from the scope of the described invention. Although this invention has been shown in relation to a particular embodiment, it should not be considered so limited. Rather, the described invention is limited only by the scope of the appended claims.

What is claimed is:

1. An apparatus for handling code segment violations in a pipelined processor comprising:

detection logic that provides one or more code segment violation detection signals;

circuitry that provides a blocked-at-retirement signal; and combinatorial logic responsive to the one or more code segment violation detection signals and the blocked-at-retirement signal that provides a block signal which blocks a bus access from occurring in response to a memory operation, the combinatorial logic also providing a data valid signal which indicates the memory operation has completed.

2. The apparatus of claim 1 wherein the combinatorial logic comprises an AND gate.

3. The apparatus of claim 1 wherein the pipelined processor comprises a reorder buffer which includes the code segment violation detection logic.

4. The apparatus of claim 1 further wherein the pipelined processor further comprises a data cache unit, with the block signal being coupled to the data cache unit and the data valid signal being coupled to the reorder buffer.

5. A processor comprising:

a reorder buffer which maintains a sequential listing of micro-operations, the reorder buffer providing one or more code segment violation signals;

a data cache unit;

a memory order buffer, the one or more code segment violation signals being coupled to the memory order buffer and combined with an at-retirement signal to provide a first intermediate signal, the first intermediate signal being logically ORed with other blocking signals to provide a second intermediate signal, the first intermediate result also being logically ORed with a writeback valid signal to provide a third intermediate signal, the second intermediate signal being coupled to the data cache unit to selectively disable bus requests, and the third intermediate signal being coupled to the reorder buffer to indicate that a memory operation has completed.

* * * * *

UNITED STATES PATENT AND TRADEMARK OFFICE
CERTIFICATE OF CORRECTION

PATENT NO. : 5,708,843
DATED : January 13, 1998
INVENTOR(S) : Abramson et al.

It is certified that error appears in the above-identified patent and that said Letters Patent is hereby corrected as shown below:

In column 1 at line 29 delete "mount" and insert --amount--

In column 1 at line 30 delete "mount" and insert --amount--

In column 1 at line 37 delete "mount" and insert --amount--

Signed and Sealed this

Twenty-third Day of June, 1998

Attest:

BRUCE LEHMAN

*Attesting Officer*  *Commissioner of Patents and Trademarks*